July 28, 1959 — A. S. CRANDON, JR — 2,896,376
APPARATUS FOR DRAWING SHEET GLASS
Filed Aug. 8, 1957 — 2 Sheets-Sheet 1

INVENTOR.
Albert S. Crandon, Jr.
BY Webb, Mackey & Burden
HIS ATTORNEYS

July 28, 1959  A. S. CRANDON, JR  2,896,376
APPARATUS FOR DRAWING SHEET GLASS
Filed Aug. 8, 1957  2 Sheets-Sheet 2

INVENTOR.
Albert S. Crandon, Jr.
BY
Webb, Mackey & Burden
HIS ATTORNEYS

United States Patent Office 2,896,376
Patented July 28, 1959

2,896,376

APPARATUS FOR DRAWING SHEET GLASS

Albert S. Crandon, Jr., Pittsburgh, Pa., assignor to American Window Glass Company, Pittsburgh, Pa., a corporation of Pennsylvania Application August 8, 1957, Serial No. 676,968

9 Claims. (Cl. 49—17)

This invention relates to the manufacture of sheet glass by those processes in which a continuous ribbon or sheet of glass is drawn from a molten bath in a drawing pit or chamber. More particularly, it relates to improvements in controlled air circulation in that chamber whereby eddy currents and rising columns of turbulent air are minimized in the immediate vicinity of the glass being drawn.

In the Fourcault process of manufacturing sheet glass, the molten glass is caused to flow or well upwardly through a slot in a debiteuse and is then drawn vertically from the slot. It is then passed between coolers within the drawing pit or chamber which cool and partially set the sheet. The sheet is moved upwardly through a vertically extending annealing lehr in which the rolls of the drawing machine proper are housed. Adjacent the top of the lehr, the continuously rising glass sheet is scored and cut into desired lengths.

The zones through which the sheet successively passes are in atmospheric communication and the heat from the drawing pit and that given off by the glass as it moves upwardly through the various zones produces uncontrolled currents of air which flow from the stretching and setting zone in the direction of travel of the sheet and, consequently, currents of colder air are drawn into this zone, thereby causing turbulence and unequalized heat in the stretching and setting zone which results in nonuniform cooling of the glass. Similar difficulties are encountered in other drawing processes in which the sheet is drawn vertically from the bath of molten glass and then passed through a horizontally extending lehr.

In accordance with a known manufacturing practice, cross currents of forced air are provided to interrupt the foregoing chimney effect, but where any substantial amount of the gas being transversely circulated is not carried from one edge of the sheet being drawn to at least the other edge and where it instead passes vertically along the sheet, there is a substantial tendency for it to rise with the sheet and create air currents or heat waves leading to distortion in the finished product. The air currents or heat waves themselves are also conducive to instability of air pressure in the direction of the width of the sheet and, therefore, secondary eddy currents or turbulence tends to develop along the faces of the glass. If the forced air flow is not of a uniform character substantially eliminating all turbulence, the resulting product will have waves or batter, both of which produce distortion of light passing through the finished product.

The present invention largely eliminates the foregoing irregularities by providing a forced transverse flow of the ambient air in the drawing pit adjacent the meniscus of a rising sheet from each edge to the opposite edge and in mutually opposite directions of flow across the faces of the rising sheet so as to constantly recirculate air in a path closing on itself. The injection of additional gas or air into that path or into the pit generally, is not only unnecessary but undesirable and the steady current of ambient air thus produced stays well mixed without hot or cold streaks. It results in a fairly high but equalized temperature condition of ambient gas completely around the sheet with a consequently stable atmospheric pressure and equalized transfer of heat from the glass to that gas. In addition to minimizing the conditions causing distortion, I am able thus to reduce and equalize the initial permanent strain imparted to the glass as the glass sets and can accordingly provide improved annealing and relatively fast drawing speeds without excessive breakage in the machine or attendant breakage of the sheets in the storage rack.

More specifically, I utilize the usual main coolers extending longitudinally of the drawing pit for solidifying the emerging glass and, in addition, I provide U-shaped air return pipes at the opposite ends of that pit which carry adapter boxes disposed on their respective leg portions to support the coolers in confronting positions to the opposite faces of the sheet being drawn. I prefer that the adapter boxes be of a hollow construction and I provide a self-contained air impeller adjacent the return bend in each pipe which draws a current of air through the adapter box on one leg and forces that air through the other box so as to scrub the associated cooler of its stagnant air film as well as to steadily contact the adjacent face of the sheet.

From their positions located within the return bend pipes at opposite ends of the pit as indicated, I cause rotation of the air impellers in a properly selected sense to make the pipes operate in tandem in forcing circulation of the ambient air through the hot pit and I effectively insulate the drive means necessary for those impellers by locating impeller drive motors remote to the pit and providing a long drive shaft connection leading therefrom to the different impellers and thus avoid exposure of the motors to the heat of the drawing pit.

Further features, objects and advantages will either be specifically pointed out or become apparent from the following description taken in conjunction with the accompanying drawings which show a preferred embodiment thereof. In the drawings.

Figure 2:
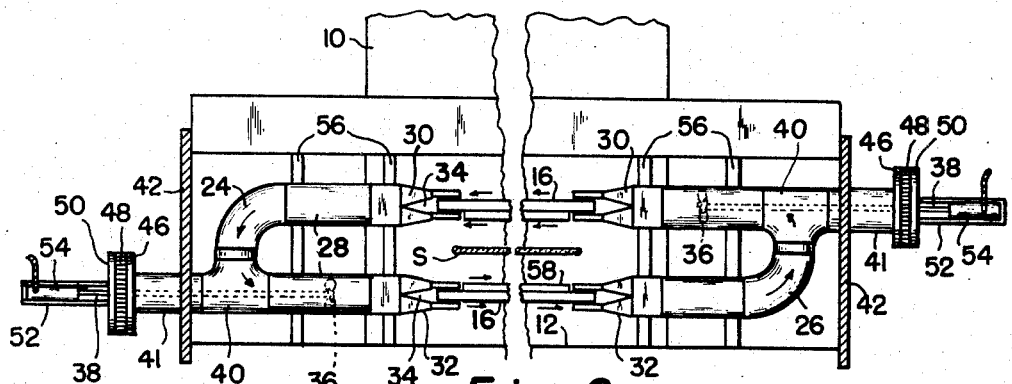
Figure 2 is a horizontal section through the drawing pit shown in Figure 1.

In the drawings, molten glass in a bath B is fed from a canal 10 to a drawing chamber or pit 12, the drawing pit 12 being separated from the canal by means of a bridge wall. A floating debiteuse block 14 has a longitudinally extending drawing slot and is positioned and held partially submerged in the glass bath B by appropriate presser bars (not shown) which cooperate with the four corners of the block. Glass wells upwardly through the slot in the debiteuse block and is initially started vertically by means of a bait. The glass sheet indicated at S is drawn upwardly through the drawing pit 12 between a pair of longitudinally extending main water coolers 16 and further auxiliary coolers if desired, which are positioned adjacent opposite faces of the rising sheet. It then passes from the drawing pit vertically into the base of the drawing machine proper or lehr 18. Water is circulated through the coolers 16 by circulation pipes 20. In this manner the rising sheet S is cooled and solidified. The lehr 18 is provided with a plurality of pairs of glass carrying rolls 22 and is of sufficient length to permit further cooling and annealing of the glass sheet to a point where it can be manually or otherwise handled. At the top of the lehr 18, the rising sheet or ribbon is separated into individual sheets and the sheets are removed to a cutting room for cutting into any desired size.

It is desirable that there be no uncontrolled gaseous movement adjacent the rising glass sheet in the drawing pit when it is in a formative stage. I, therefore, prefer that the pit be kept as tightly closed as practicable during operations in order to materially reduce air infiltration and accommodate only controlled movement of the gases present in the pit. Consequently, I provide a pair of U-shaped air-return pipes 24 and 26 formed similarly out of stainless steel or equivalent material capable of resisting the deleterious effects of the heat of the pit 12. These pipes are disposed in the opposite ends of the pit. The return bends in pipes 24 and 26 cooperate to circulate ambient air horizontally in the pit without dilution and with controlled movement in a counterclockwise path closing on itself according to Figure 1. It is the function of the water-filled coolers 16 to absorb and dissipate the heat received from the emerging glass. The moving blanket of intervening air stays substantially in a thermal state of equilibrium, acting primarily as the transfer medium for heat between the hot sheet S and the heat absorbing coolers 16.

In the interests of brevity, only the return bend pipe 24 is described. This pipe 24 includes a partially curved base forming the return bend thereof and carrying inwardly extending straight leg portions 28. The leg portions 28 are preferably of round cross-section and lay parallel to one another. They carry a pair of adapter boxes 30 and 32 at their inner ends. The adjacent end portions of the main coolers 16 are supported in adapter box slots 34 which extend downwardly for a substantial part of the depth of each adapter box so as to define a U-shaped receptacle, in end cross-section, effectively interengaging the adjacent end of the cooler. The sidewalls of each slot 34 hold the adjacent cooler and the adjacent leg portion 28 of the pipe in precise alignment and also in alignment with the similar leg portion of the opposite return pipe 26.

An air impeller 36 is mounted in one of the straight leg portions 28 of the pipe 24 for moving air in a turn around the adjacent edge of the sheet S. An elongated drive shaft 38 is connected at one end to rotate the impeller 36 and passes through an open T 40 which is incorporated in the structure of the U-shaped air-return pipe 24 so as to carry a pipe extension 41 on the structure extending in the opposite direction from the leg portions 28 and protruding through an end wall 42 of the pit 12. The shaft member 38 is mounted therein with a rotating fit in spaced line shaft bearings (not shown) along its length.

Figure 1:
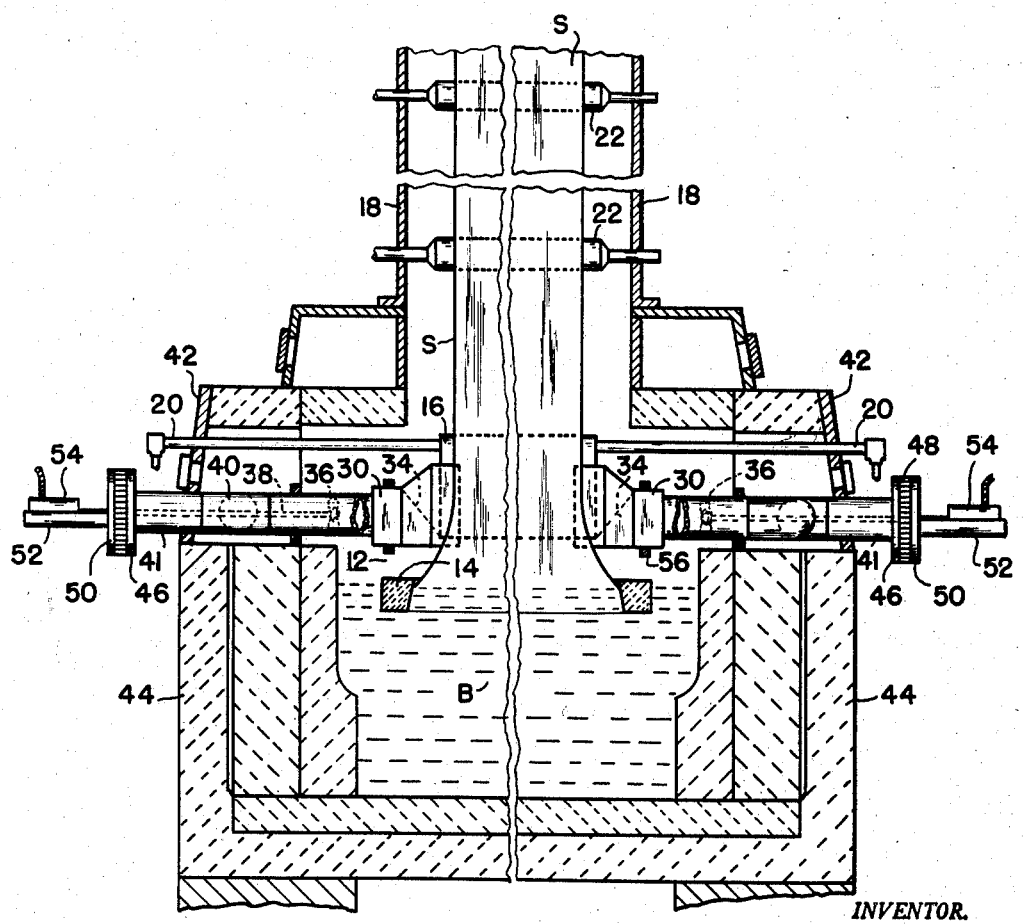
Figure 1 is a vertical sectional view through a drawing pit embodying apparatus which I provide.

The walls of the drawing pit 12 are always incandescent and the heat on the end wall 42 is considerable although of somewhat lesser intensity than the major sides. The extension 41 can be aligned to pass through a door opening in the end wall 42 and rests on a breast wall 44 (Figure 1). In this manner the extension 41 insures a spaced relation of the shaft 38 in the door opening and forms a sheath shielding the shaft from exposure to the direct impact of heat from the walls of the pit. The extension 41 also provides an enclosed air space directly communicating with the interior of the pipe 24 and is sealed by an end closure means consisting of an attachment flange 46 welded thereto, a concentric heat insulating gasket 48 of Transite material having a shaft opening at the center, and a blind flange 50 clamping the insulating gasket to the flange 46 and having an aligned shaft opening with sufficient clearance to receive the rotating shaft member 38.

A diametrically split piece of pipe 52 affixed to extend outwardly from the remote side of the closure means forms a motor mounting base carrying a variable speed air motor 54 which is connected to drive the self-contained fan in the pipe 24, by means of the impeller shaft 38 and appropriate shaft couplings (not shown). The pipe 24 is supported at convenient points upon the end of the drawing pit 12 and in that vicinity pit positioners and border stabilizer holders 56 are also provided in the pit to secure the opposite leg portions 28 in place.

Figure 3:
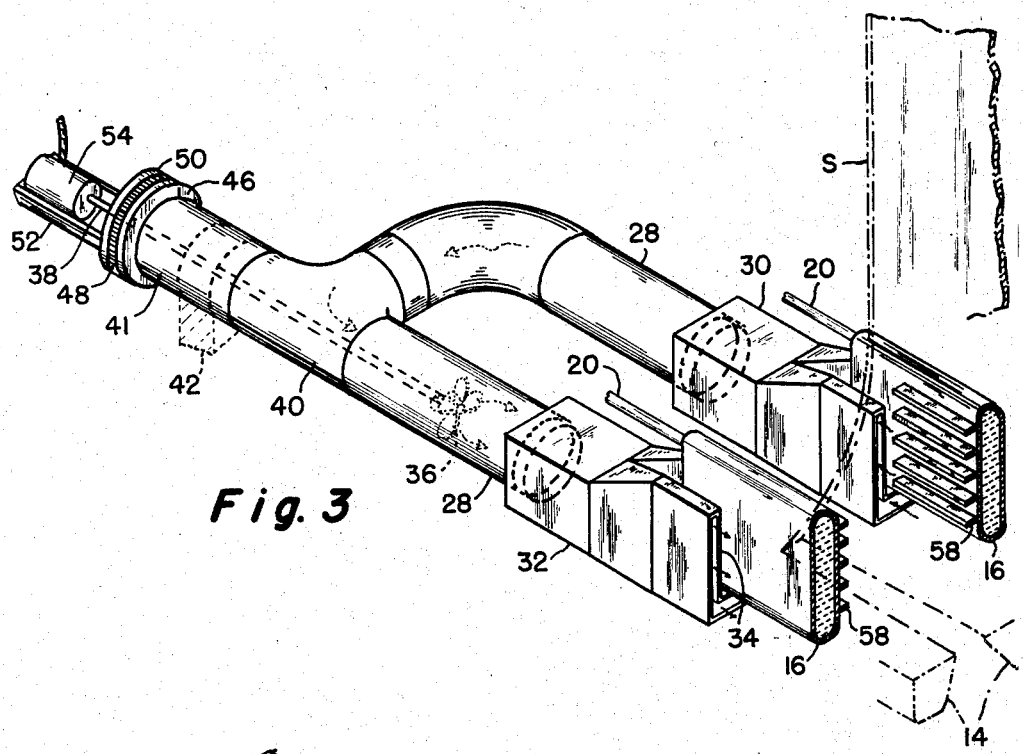
Figure 3 is a perspective view of the air system in the apparatus, showing the adapter boxes supporting the main coolers.

As shown in Figure 3, the main water coolers 16 are provided with longitudinally extending horizontal fins 58 on the inner side which faces the glass sheet S. The fins 58 greatly multiply the surface area of the coolers for absorbing radiation from the hot sheet so as to contribute materially in solidifying it; and in view of the fact that the adapter boxes 30 and 32 are preferably hollow, as illustrated, the fins 58 serve the added function of keeping the air current induced by the impeller 36 directional and free from any material dispersion as it moves along the face of the sheet S. The effective cooperation between the air-withdrawing boxes 30 and the aligned finned coolers 16 which channel the air in a relatively straight path, establishes a complete air circuit uninterrupted in the direction of the width of the sheet S. The selected direction of running the motor 54 makes the driven impellers 36 move air in the directions of the arrows shown, and, as just indicated, each adapter box 30 exhausts air from the direct vicinity of the end portion of the adjacent cooler 16 and the withdrawn air is immediately discharged from the mouth of the companion box 32 in an air column coaxial to the other cooler 16. Circulating air from both pipes 24, 26 thus will not only contact the faces of the glass sheet S in opposite directions, but also tends to scrub the under surface and side surfaces of the coolers free from an adherent film of stagnant air which otherwise tends to impede the conduction of heat across the gap between the glass sheet S and the cooler 16.

Figure 4:
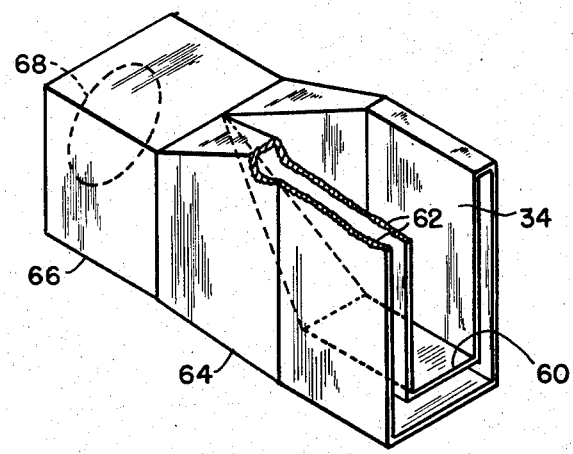
Figure 4 is an enlarged perspective view of an adapter box of Figure 3.

As shown in Figure 4, the slot 34 in each adapter box presents a cooler supporting floor 60 which is hollow and which together with the likewise hollow side walls 62 of the slot defines a U-shaped mouth serving either as an air intake for the associated pipe or as a discharge nozzle depending on whether present on the box 30 or 32 carried by that pipe.

A midportion 64 of each adapter box serves as a transition member between the end portions and has hollow side walls and a floor leading longitudinally from a generally U-shaped cross-section into a central chamber of an attachment end portion 66 having a round opening 68 at the rear which securely fits the associated end of the leg portion of the pipe. A bundle of individual passage-forming tubes or a series of longitudinal guide baffles or other distributing means to assist in creating uniformity of air flow may be provided within the mouth of the hollow nozzle sections of the adapter boxes in a manner which is well-known in the art and, therefore, not illustrated.

The apparatus described provides a novel method of treating the glass during manufacture, including the steps of drawing the glass past cooling surfaces which in spaced relation confront the faces of the sheet being drawn, and continuously stabilizing the surrounding atmosphere while augmenting the heat transfer rate from the solidifying faces of the sheet to the cooling surfaces, by withdrawing air from a point offset from one face of the sheet and immediately reintroducing the withdrawn air without dilution to a different face in a manner to also scrub the confronting cooling surface of the film of stagnant air adhering thereto. The air motors 54 are run at proper speed in the range between a lower limit of maintaining too small a volume of air flow and an upper one forcing the ambient air to circulate at too high a velocity, in either case of which the formation of eddy currents might be deleterious to the character of the finished product. The properly controlled constant current of air desired causes the normally vertically acting heat waves or convection currents to be pulled into the horizontal stream, thus minimizing their optically injurious effects on the sheet.

The speeds of the motors 54 relative to one another are adjusted to insure a balanced load-sharing relationship between the return bend pipes 24 and 26 as they operate in tandem on the common current of ambient air. Thus my system, without the necessity for air valves in the pipes or precision temperature controls therein or air preheaters, provides uniformly distributed air pressure without excessive build-up on either side of the glass sheet, and also equal transfer of heat from the glass to the surrounding atmosphere. As a consequence, a greater uniformity of temperature is maintained in the glass and improved annealing is obtained. By this statement I do not mean to imply that the temperature at various points on the sheet are necessarily equal. For example, the temperature at the edges of the rising sheet may be somewhat lower than those prevailing intermediate the edges. In stating that the temperatures are rendered uniform, I mean that the temperature gradient from the center to each edge is substantially uniform in comparison to former processes wherein the temperature gradient fluctuates materially.

As herein disclosed, the fan system embodied in my invention combines the advantage of mechanically forced air circulation in the pit with the feature of having short, efficient air-returns in the system which are self-contained within the confines of that pit. This latter feature is not only a desirable one but is greatly preferred, in a system of the present character, because of the objective sought for, whereby the pit air remains undiluted with no appreciable portion of the flow being led temporarily or regularly from the pit confines and neither that portion nor additional gaseous fluid requires injection or re-injection into the pit. Where my invention is used the present, faster drawing speeds are possible without consequent machine and rack storage breakage. Additionally, this invention materially aids in reducing batter and distortion in the finished product.

Variations within the spirit and scope of the invention described are equally comprehended by the foregoing description.

I claim:

1. Apparatus for drawing sheet glass comprising means to hold molten glass, means to draw a sheet vertically therefrom, a pair of generally U-shaped air return pipes disposed one adjacent each end of the meniscus of the sheet being drawn, each of said pipes being provided with an adapter box supported on at least one of its leg portions so as to confront the adapter box on the corresponding leg portion of the other pipe, longitudinally extending cooler means supported at the opposite ends on said adapter boxes in face to face arrangement with the glass as it is being drawn, and rotary means mechanically forcing air through said pipes to pass in opposite directions on the faces of said sheet for mutually establishing a common air path closing on itself.

2. Apparatus according to claim 1 and further including energy absorption fins affixed to the cooler means in a longitudinal arrangement therewith fostering air to seek a defined path without excessive dispersion.

3. In apparatus for drawing sheet glass comprising means to hold molten glass and means to draw a sheet vertically therefrom, the improvement comprising a pair of generally U-shaped air return pipes disposed one adjacent each end of the meniscus of the sheet being drawn, each of said pipes being provided with adapter boxes supported on leg portions of each pipe so as to align with the adapter boxes on the corresponding leg portion of the other pipe, longitudinally extending coolers supported at the opposite ends thereof on the adapter boxes at those ends, axial flow-fans shrouded by and rotatable within said pipes for forcing air in opposite directions relative to the faces of said sheet so as to form a common path closing on itself, and energy absorption fins affixed to the coolers in a longitudinal disposition therewith to foster air seeking its defined path without excessive dispersion.

4. Apparatus for drawing sheet glass comprising a drawing pit for containing a bath of molten glass therein, means for drawing a sheet of glass upwardly from said bath, a recirculating air-return pipe having leg portions in said pit straddling the plane of the sheet being drawn for conducting air from contact with one face of the sheet into contact with the other face in a transverse direction thereto, coolers on each side of the sheet each provided with a plurality of horizontal vertically spaced guide fins for the longitudinal movement of ambient air, and means to create a forced draft consisting essentially of horizontal movement between the coolers and the sheet comprising an air-fanning impeller in a portion of said pipe, and remote drive means connected to drive said air impeller from a point external to said pit.

5. Apparatus according to claim 4 wherein the connection between said remote drive means and the air impeller comprises an elongated shaft member extending from said external point through an end wall of said pit thence to a point of connection with said impeller.

6. Apparatus for drawing glass from a pit of molten glass comprising means for drawing a sheet of the glass upwardly from said pit, a recirculating air-return pipe having leg portions in said pit straddling the plane of the sheet being drawn for conducting air from contact with one face of the sheet into contact with the other face in a transverse direction thereto, another portion of said pipe extending therefrom in a different direction from said leg portions so as to protrude through a wall of said pit, closure means comprising a concentric heat insulating gasket element and a blind flange element therebehind for blanking off the outer end of said pipe portion last named, an impeller in a portion of said pipe, externally mounted power drive means, and a power driven shaft member connected to said external power drive means and extending through a shaft opening in said closure means elements and through said extension portion and connected to drive said impeller.

7. In apparatus for the manufacture of drawn glass comprising means for drawing a sheet upwardly therein, the combination of a drawing pit for containing molten glass therein from which the sheet is drawn, an air pipe within said pit containing an impeller, an extension at an outer end of said pipe passing externally through a wall of said pit and provided with an external closure, said external closure comprising a concentric heat insulating gasket element and a blind flange element therebehind for blanking off said extension, and remote drive means for said impeller comprising a member passing through said extension closure from a point external of said pit to a point of connection with said impeller.

8. In apparatus for the manufacture of drawn glass comprising means for drawing a sheet upwardly therein, the combination of a drawing pit for containing molten glass therein from which the sheet is drawn, an air pipe within said pit containing an impeller, remote drive means for said impeller comprising a member extending from a point external of said pit through said pipe to an intermediate point of connection with said impeller, an adapter box on the inner end of said pipe, and a coolerreceiving slot provided therein with the sides of the slot arranged to align a cooler with the adapter box.

9. In apparatus for the manufacture of drawn glass comprising means for drawing a sheet upwardly therein, the combination to hold the drawing pit of molten glass from which the sheet is drawn, an air pipe within said pit containing an impeller, an extension at an outer end of said pipe passing through a wall of said pit, and remote drive means for said impeller comprising a member passing through said extension from a point external of said pit to a point of connection with said impeller, an adapter box forming a nozzle on the opposite end of said pipe, and a slot of partial depth provided therein, having the floor thereof arranged to support a cooler on said box with the sides of said slot holding same in alignment.

References Cited in the file of this patent

UNITED STATES PATENTS

| | | |
|---|---|---|
| 2,158,669 | Amsler | May 16, 1939 |
| 2,458,040 | Weller | Jan. 4, 1949 |

UNITED STATES PATENT OFFICE

CERTIFICATE OF CORRECTION

Patent No. 2,896,376                                   July 28, 1959

Albert S. Crandon, Jr.

It is hereby certified that error appears in the printed specification of the above numbered patent requiring correction and that the said Letters Patent should read as corrected below.

Column 7, line 5, for "to hold the drawing pit of" read -- of a drawing pit to hold the --.

Signed and sealed this 29th day of December 1959.

(SEAL)
Attest:

KARL H. AXLINE                                  ROBERT C. WATSON
Attesting Officer                                  Commissioner of Patents